United States Patent [19]

Wisniewski

[11] Patent Number: 4,653,075
[45] Date of Patent: Mar. 24, 1987

[54] BPSK SYNCHRONIZER USING COMPUTATIONAL ANALYSIS

[75] Inventor: Jacob H. Wisniewski, Palo Alto, Calif.

[73] Assignee: Ford Aerospace & Communications Corp., Detroit, Mich.

[21] Appl. No.: 717,999

[22] Filed: Mar. 29, 1985

[51] Int. Cl.$^4$ .............................................. H04L 7/02
[52] U.S. Cl. .................................... 375/110; 375/118; 307/518; 328/118
[58] Field of Search ............... 375/110, 118, 108, 106; 328/118; 307/518, 234, 527

[56] References Cited

U.S. PATENT DOCUMENTS

| | | | |
|---|---|---|---|
| 3,551,816 | 12/1970 | Paine | 375/110 |
| 4,146,743 | 3/1979 | Raynham | 375/110 |
| 4,246,653 | 1/1981 | Malm | . |
| 4,246,654 | 1/1981 | Malm | . |
| 4,247,943 | 1/1981 | Malm | . |
| 4,290,140 | 9/1981 | Malm | . |
| 4,385,395 | 5/1983 | Tanaka et al. | 375/110 |
| 4,457,005 | 6/1984 | Burke et al. | . |

OTHER PUBLICATIONS

Houston, S. W., et al., "Microprocessor Bit Synchronizer for Shuttle Payload Communications", IEEE Transactions on Communications, vol. COM-26, No. 11, Nov. 1978, pp. 1594-1603.

Primary Examiner—Robert L. Griffin
Assistant Examiner—M. Huseman
Attorney, Agent, or Firm—Edward J. Radlo; Clifford L. Sadler

[57] ABSTRACT

A bit synchronizer for a BPSK input signal having a sinusoidal carrier frequency f that is much greater than the modulating signal bit rate. The synchronizer comprises means (29, 31) for repetitively sampling the amplitude of the input signal over a preselected sampling interval portion of each modulating signal bit period (T). For each sampling interval, three numbers are recorded: N1, the total number of samples; N2, the number of samples that do not change sign with respect to a reference sample; and N3, the number of samples that do change sign with respect to the reference sample. When the number of samples not changing sign exceeds a preselected threshold value, which takes into account noise corruption of the input signal, bit synchronization is declared, a synchronized output clock (39) is generated, and digital data having a 180° ambiguity is sent to subsequent ambiguity resolution means. When synchronization has not yet occurred, and the last sample changed sign, a phase circuit 34 is adjusted to shift in the proper direction a local clock (38), causing time-shifting of the sampling interval window prior to examination of the next modulating signal bit period (T).

6 Claims, 5 Drawing Figures

FIG. 1 MODULATED INPUT SIGNAL

FIG. 2 EXPANDED VIEW OF CARRIER AT PHASE TRANSITION

BPSK SYNCHRONIZER USING COMPUTATIONAL ANALYSIS

DESCRIPTION

1. Technical Field

This invention pertains to the field of synchronizing a binary phase shift keyed (BPSK) sinusoid.

2. Background Art

Houston, S. W., et al., "Microprocessor Bit Synchronizer for Shuttle Payload Communications ", *IEEE Transactions on Communications,* Vol. COM-26, No. 11, November 1978, pp. 1594–1603, describes a "Payload Signal Processor" (PSP) having a microprogrammable bit synchronizer detector. The input signal is a 1.024 MHz subcarrier PSK modulated by a continuous stream of digital telemetry data at 1, 2, 4, 8, or 16 Kbits/sec. The reference system uses analog integrate and dump filters to search for individual phase transitions. The present invention, on the other hand, uses a statistical criterion to determine phase transitions, and all the processing is performed digitally.

U.S. Pat. No. 4,457,005 shows a PSK demodulator which differs from the present invention in that: (1) phase transitions are searched for individually, not statistically; (2) it uses a square wave carrier, rather than a sinusoidal carrier; (3) the bit period is 2.5 times the carrier period (col. 2, line 53), whereas in the instant invention the bit period T is an integral multiple of the carrier cycle, and (4) sampling is performed every quarter carrier period (col. 2, line 60), as opposed to exactly at integral multiples of the carrier cycle.

U.S. Pat. Nos. 4,246,653 and 4,247,943 describe a demodulation system in which a local reference is not phase locked with a received signal, but rather the received signal is mixed with sine and cosine signals to obtain mulitple outputs which are correlated with pre-established code words to determine the particular code word that has been sent.

U.S. Pat. No. 4,246,654 describes a phase demodulator having a phase comparison portion that does not suggest the techniques described in the present specification. The demodulator obtains a maximum likelihood estimate of the unmodulated phase and the rate of change of the unmodulated phase of the received signal with respect to a local oscillator, so that the local oscillator can be compensated in phase.

U.S. Pat. No. 4,290,140 describes a system for demodulating a combined FSK/PSK signal, whereas the present invention synchronizes a BPSK signal having a constant bit rate. The portion of the reference system pertaining to PSK does not suggest the techniques described in the present specification.

DISCLOSURE OF INVENTION

The input signal is a sinusoidal carrier biphase modulated by digital data, such as short messages in bursts of 200–220 bits meant for command messages to a spacecraft.

The input signal has a sinusoidal carrier frequency of f. The binary modulating signal has a period of T (i.e., a frequency of 1/T). f is much greater than 1/T, preferably at least 16 times greater than 1/T.

The present invention comprises means (29, 31) for repetitively sampling the amplitude of the input signal over a sampling interval portion, typically 80%, of each modulating signal bit period. The frequency f of the carrier sinusoid is an integral multiple of the rate at which samples are taken. A microprocessor (23) records the total number of samples (N1) taken within the sampling interval, the number of samples that do not change sign (N2), and the number of samples that do change sign (N3).

The microprocessor (23) declares a synchronization condition when the number of samples which do not change sign (N2) exceeds a threshold level that is preselected based upon the tolerable amount of error due to noise. Determination of whether a sample has changed sign is made with respect to the sign of a reference sample, preferably the first sample taken for each sampling interval.

The input signal (at the sampling instants of sampling clock 35) is digitized by means of an analog-to-digital (A/D) converter (29). The determination of whether a given sample has changed sign is preferably made by multiplying the value of the given sample by the value of the reference sample and examining the sign of the product.

When synchronization is not declared at the end of a sampling interval, and the last sample for that interval has a different sign than does the reference sample, a phase circuit (34) is adjusted to time shift the sampling interval window for the next modulating signal bit period.

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

Figures 1, 2:
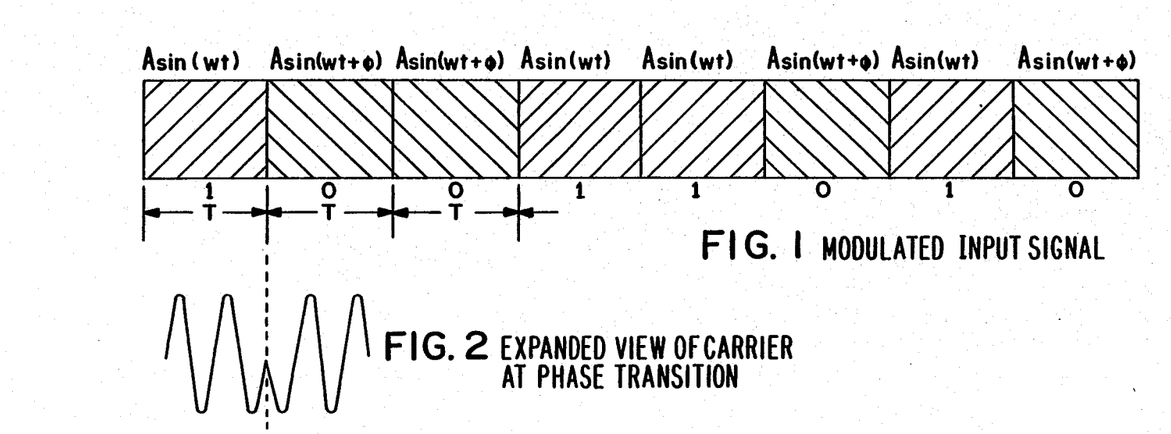
FIG. 1 is an artist's representation of the modulated information carried on the input BPSK signal.
FIG. 2 is a waveform of the input sinusoid at a phase transition.

The baseband input signal processed by the present invention is illustrated in FIG. 1. This signal is of the form Asin(wt+$\phi$) where $f=w/2\pi$ is the frequency and $\phi$ may assume two values only, 0 or pi. Thus, Asinwt may represent the logic symbol "1" and Asin(wt+$\phi$) the logic symbol "0", or vice versa.

Changes of phase of the input signal may occur only at integral multiples of T, the bit period of the modulating signal. Period T is an integral multiple m of a carrier cycle $2\pi/w$.

In a typical example of the invention, T=4 millisec., 1/T=250 Hz, and f=16 KHz. Therefore, m=64. In general, m is preferably greater than or equal to 16.

Figure 3:
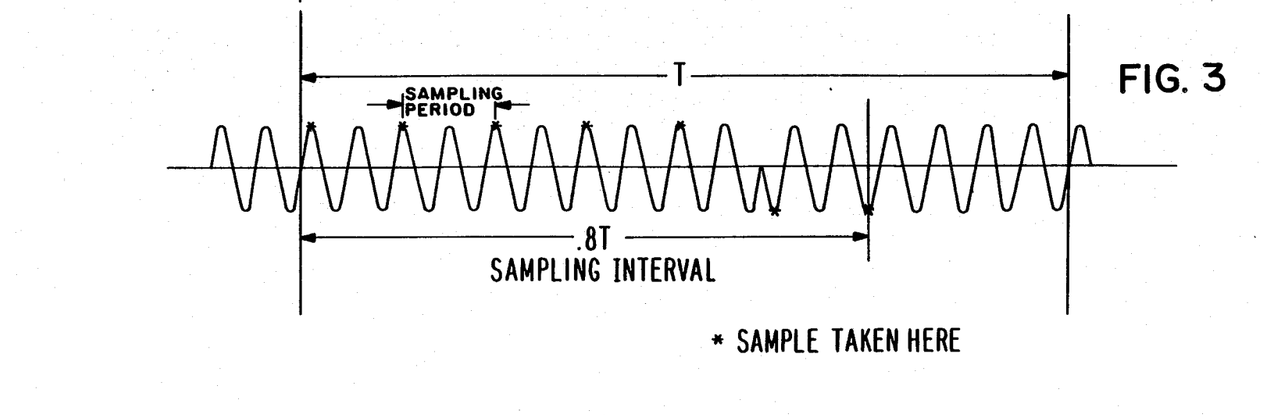
FIG. 3 is an exemplary input waveform showing modulating bit period T and sampling interval 0.8T encompassing a phase transition.

An expanded view of the carrier at phase transition is shown in FIG. 2. FIG. 3 illustrates that the sampling interval, throughout which samples are taken, is some preselected portion of the bit period T. Typically, each sampling interval is on the order of 0.8T; during the remaining 0.2T, ALU 23 performs necessary calculations. Sampling is performed during each modulating bit period T. The input signal is sampled once each "sampling period". The sampling period is an integral multiple of the carrier cycle. Thus, the sampling period is $2N\pi/w$, with N an integer. In FIG. 3, $N=2$.

A reference sample is designated once each sampling interval. Typically, the reference sample is the first sample taken during the sampling interval. Every other sample taken during that sampling interval is compared with the reference sample for a change of sign, indicating a phase transition.

For each sampling interval, a record is kept of three events: N1, the total number of samples taken during the sampling interval; N2, the number of samples taken during the sampling interval which did not change sign; and N3, the number of samples taken during the sampling interval which did change sign. When a certain preselected percentage of the samples taken during the sampling interval have been recorded not to have changed sign, a determination of bit synchronization is made. Otherwise, it is determined that bit synchronization has not yet occurred, and the sampling period window 38 is shifted in a direction depending upon the direction of the error. This bidirectional shifting saves the amount of shifting that must be done and shortens the mean time of synchronization acquisition.

In an example of a working embodiment that will be described in detail with respect to FIGS. 4 and 5, $T=10$ millisec., $1/T=100$ Hz, and $f=19.2$ KHz, so $m=192$. Each sampling interval comprises about 80% of the bit period T, and $N=2$, so the number of samples examined during each bit period is 76. Thus, if the input signal is totally bit synchronized and assuming no noise, the number of samples over the sampling interval not changing sign is 76, and the number of samples over the same sampling interval changing sign is 0. In the illustrated embodiment, the synchronization threshold is placed at 70, i.e., if at least 70 of the samples in a bit period do not change sign, a synchronization condition is declared. The reason for using 70 rather than 76 is to allow for errors in transmission, and because companion circuits, e.g., and ambiguity resolution demodulator, are able to function properly when this percentage (92%) of the samples is uncontaminated.

Figure 4:
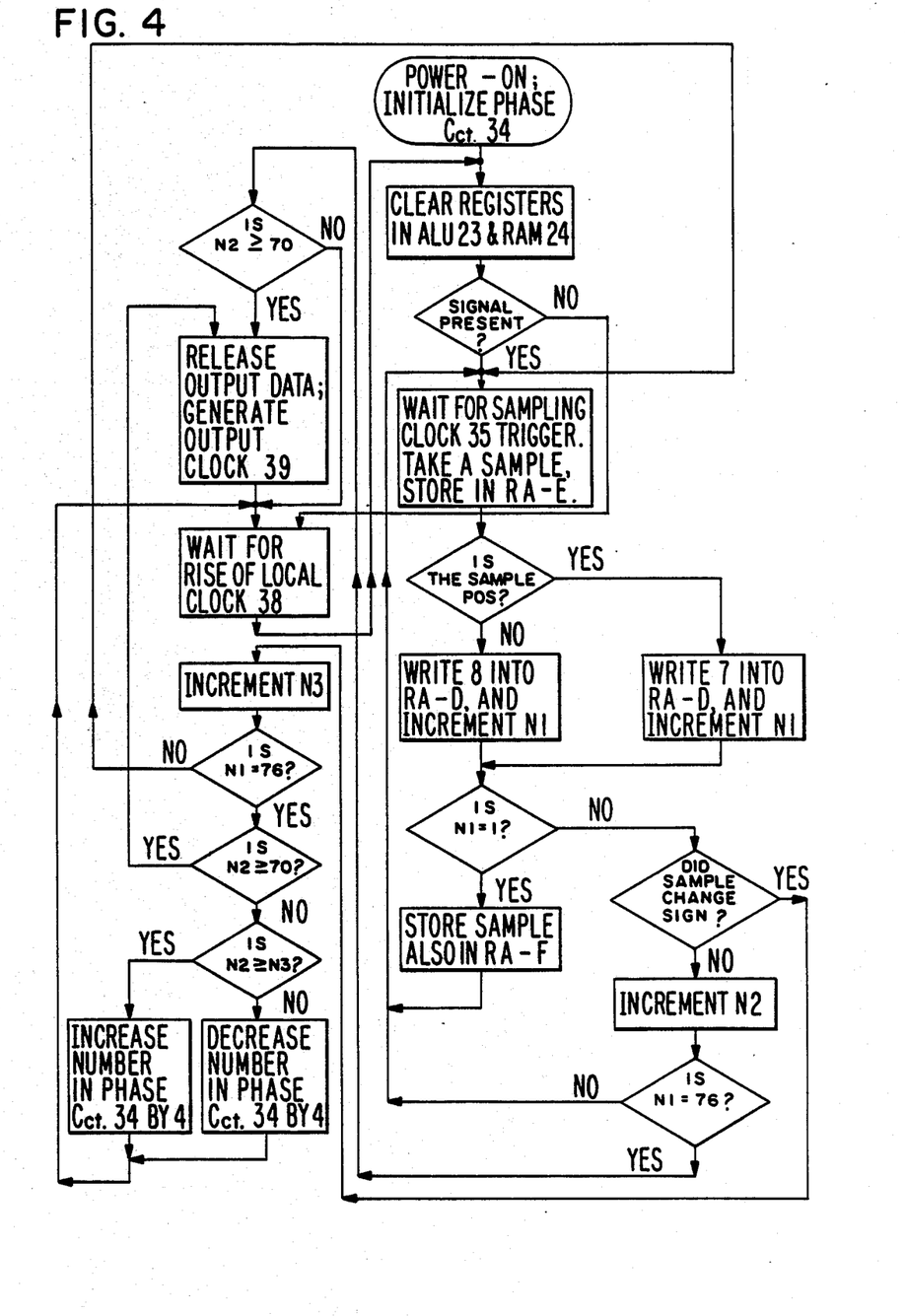
FIG. 4 is a flow chart illustrating the operation of a working embodiment of the present invention.
Figure 5:
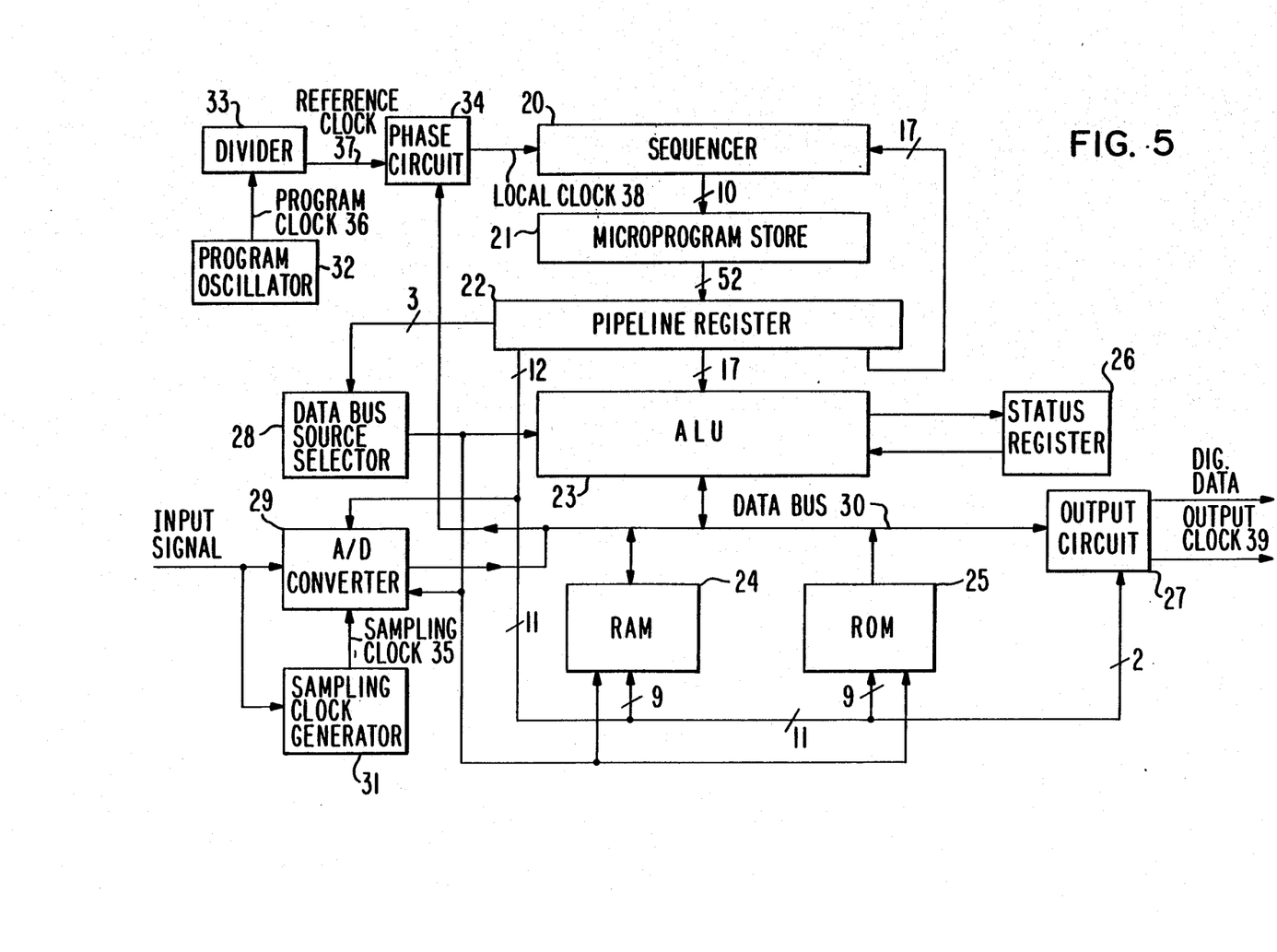
FIG. 5 is a block diagram showing hardware elements that have been assembled to perform the steps illustrated in FIG. 4.

The operation of the invention is best illustrated by examining the FIG. 4 flow chart in conjunction with the FIG. 5 block diagram. The first step is initialization of phase circuit 34, by means of presetting to 128 a modulo 256 counter that is the heart of circuit 34. Setting this counter at the middle of its range enables the sampling period window 38 to be moved an equal amount in either direction.

Next, the registers in ALU 23 and RAM 24 are cleared by setting them equal to zero. In this example, ALU 23 is a 4-bit slice AMD 2901 Arithmetic Logic Unit having 16 registers denominated RA-0 through RA-F in hexidecimal notation. RAM 24 is used by ALU 23 as a scratchpad memory, and communicates therewith by means of bidirectional data bus 30. Bidirectional data bus 30 is also used to convey the digitized input signal from A/D converter 29 to ALU 23; to convey ALU 23's decision that synchronization has occurred from ALU 23 to a pulse generator within output circuit 27; to convey a 180°-ambiguous representation of the modulating data from register D within ALU 23 to a flip-flop within output circuit 27; and to convey commands from ALU 23 to phase circuit 34 instructing phase circuit 34 whether and in what direction to shift. The program is stored in microprogram store 21, and AMD 2708 EPROM, which feeds instructions to ALU 23 via pipeline register 22, a buffer. Data bus source selector 28 picks the proper inputs for the logical operations performed by ALU 23. Status register 26 is a 4-bit register for storage of sign, carry, overflow, and zero flags. ROM 25 stores constants, e.g., the synchronization threshold, which in this case is 70.

As is conventional, a short numbered line interrupting a connection line on the FIG. 5 block diagram indicates the number of bits that are sent between the two blocks.

Program oscillator 32 synchronously clocks all the FIG. 5 chips at a rate of 2.4 MHz, which is fast enough for this application. The output of program oscillator 32 is program clock 36, which is divided by divider 33 to create a reference clock 37 at the bit rate of 100 Hz. Phase circuit 34 then time shifts the reference clock 37 up to plus or minus half a bit period (0.5T). The output of phase circuit 34 is local clock 38, which is the timing window defining a sampling interval. Local clock 38 triggers sequencer 20, and AMD 2910, which in turn commands the execution of the program within microprogram store 21.

The input signal is fed to A/D converter 29 and to sampling clock generator 31, which rectifies, shapes, and steps down the carrier frequency to produce sampling clock 35, which oscillates at the sampling rate and triggers outputs from A/D converter 29. If desired, generator 31 can delay sampling clock 35 by a quarter of a carrier cycle so that the samples are taken near the peaks of the sinusoids rather than near the zero-crossings.

Output circuit 27 comprises a flip-flop and a pulse generator. The flip-flop outputs a 180°-ambiguous representation of the demodulated digital input data as sent to output circuit 27 from register D within ALU 23. The pulse generator produces an output clock 39 having a frequency of 1/T, in this case 100 Hz. The pulses of output clock 39 are triggered by ALU 23 once each bit period T, immediately after the conclusion of the computational analysis described in detail herein. The digital data is subsequently processed by ambiguity resolution means which, for example, uses an 8-bit Barker code in the message preamble to resolve the ambiguities.

Returning to FIG. 4, the next step is that ALU 23 determines whether a signal is present on the input line. This determination can be made, for example, by comparing closely-spaced digitized samples within a carrier cycle to see if they follow a sine wave. If no input signal is present, no further action is taken until the next rise of local clock 38.

If an input signal is present, sampling clock 35 triggers the taking of the first digitized sample of input signal amplitude within the sampling interval. In the present embodiment, this first sample is the reference sample, and is stored in register E (hexidecimal for register 14) within ALU 23. ALU 23 then determines whether this reference sample is positive or negative. If positive, a 7 is written into register D (hexidecimal for register 13) within ALU 23, and N1, the total sample count, is incremented in another register within ALU 23. If the sample is negative, an 8 is written into register D, and again N1 is incremented.

ALU 23 then asks whether N1 is 1, i.e., was this the first (reference) sample? If so, the amplitude of the input signal at this reference sample point is also stored in register F (hexidecimal for register 15) within ALU 23, and the next digitized sample is taken when signalled by sampling clock 35.

If the current sample is not the first sample, ALU 23 asks whether the current sample has the same or a different sign as the reference sample. Preferably, this is done by comparing the values of registers of E and F by menas of multiplying their values together. If the result is positive, it follows that registers E and F contain numbers having the same sign. If the result is negative, then these registers contain numbers having opposite sign.

Either N2, the number of samples over the sampling interval not changing sign, or N3, the number of samples over the sampling interval changing sign, is incremented accordingly. N2 and N3 are registers within ALU 23. Regardless of which of these registers is incremented, ALU 23 asks the question "Is N1 equal to 76?" This is equivalent to asking whether the end of the sampling interval has been reached. If the end of the sampling interval has not been reached, the next sample is exampled upon the occurrence of the next sampling clock 35 trigger.

If the end of the sampling interval has been reached, and regardless of whether the last samle did or did not change sign, ALU 23 asks the synchronization question "Is N2 greater than or equal to 70?" If the answer is yes, then a positive determination of bit synchronization is made: digital data is released from output circuit 27 and a spike goes out on output clock 39.

If, on the other hand, N2 is less than 70, synchronization is deemed not to have occured. If the last sample did not change sign, the program waits for the next rise of local clock 38 to initiate the next sampling interval without any adjustment being made to phase circuit 34, since this condition can occur only when noise or other factors caused errors on the input signal, and it would be considered futile to try to speculate as to the time-direction of the nearest phase transition. If, on the other hand, the last sample did not change sign, it is assumed that most of the time this means that a phase transistion has occurred within the sampling interval, and an attempt is made to calculate its direction. Thus, ALU asks the question "Is N2 greater than or equal to N3? For example, in FIG. 3, N2 is greater than N3. In this eventuality, the counter in phase circuit 34 is incremented by 4 counts, which has the effect of time-advancing local clock 38, i.e., time-shifting the sampling interval window to the left in FIG. 3. If N2 is less than N3, then the counter within phase circuit 34 is decremented by 4 counts, having the effect of retarding local clock 38, i.e., time-shifting the sampling interval to the right in FIG. 3. Four counts out of the 256 in the phase circuit 34 counter corresponds to about 1.5 sampling periods. The next sampling interval is then examined upon the rise of local clock 38 triggering sequencer 20.

The following program listing is a compiled version of the microprogram stored in microprogram store 21 using a user generated instruction set. Following the program listing is an object code listing of the program in which "X" means it doesn't matter whether the entry is a 1 or a 0.

```
LINE    ADDR    BI PHASE DEMODULATOR

1                 TITLE  BI PHASE DEMODULATOR
  2                 LIST  B,X
  3                 NOLIST L
  4              ;
  5              ;
  6    00000   . ORG 100#0000:
  7    00000     FF 6X,NOP,SX,0#4,ALU,KPLN,CJP,6X,B#01,0#3,H#2,4X
  8              ;       JUMP TO KPLN
  9              ;
 10    00010     ORG KPLN
 11    00010     BUFF2 6D#00
 12    00011     XFER3 H#1,6G#10
 13    00012     XFER3 H#0,6X ;         LOAD HEX 80 INTO RA-0,1
 14    00013     MOVE1 H#1,6G#27
 15    00014     MOVE1 H#0,6G#26 ;      LOAD ABOVE #,S TO RAM-22,23
 16    00015     FF 6X,NOP,SX,0#4,FDRAM,10X,CONT,6G#27,B#01,0#3,H#A,4X
 17    00016     FF 6X,NOP,SX,0#4,PDRAM,10X,CONT,6G#26,B#11,0#3,H#6,4X
 18              ;                      LOAD ABOVE #,S TO PHASE CKT.
 19              ;
 20    00017     JUMPU PKLM
 21              ;
 22    00020     ORG PKLM
 23    00020     CLR2 H#0
 24    00021     CLR2 H#1
 25    00022     CLR2 H#2
 26    00023     CLR2 H#3
 27    00024     CLR2 H#4
 28    00025     CLR2 H#5
 29    00026     CLR2 H#6
 30    00027     CLR2 H#7
 31    00028     CLR2 H#8
 32    00029     CLR2 H#9
 33    0002A     CLR2 H#A
 34    0002B     CLR2 H#B
 35    0002C     CLR2 H#C
```

```
36   0002D    CLR2 H#D
37   0002E    CLR2 H#E
38   0002F    CLR2 H#F      ; CLEAR ALL 2901 REG'S
39            ;
40   00030    CLR1 6@#00
41   00031    CLR1 6@#01
42   00032    CLR1 6@#02
43   00033    CLR1 6@#03
44   00034    CLR1 6@#04
45   00035    CLR1 6@#05
46   00036    CLR1 6@#06
47   00037    CLR1 6@#07
48   00038    CLR1 6@#10
49   00039    CLR1 6@#11
50   0003A    CLR1 6@#12
51   0003B    CLR1 6@#13
52   0003C    CLR1 6@#14
53   0003D    CLR1 6@#15
54   0003E    CLR1 6@#16
55   0003F    CLR1 6@#17
56   00040    CLR1 6@#20
57   00041    CLR1 6@#21
58   00042    CLR1 6@#22
59   00043    CLR1 6@#23
60   00044    CLR1 6@#24
61   00045    CLR1 6@#25 ;    CLEAR PDRAM
62            ;
63            ;
64   00046    BEGIN: FF 6X,NOP,8X,@#4,ALU,10X,CONT,6X,B#01,@#3,H#0,4X
65            ; WAIT
66   00047    FF 6X,NOP,8X,@#4,ALU,10X,CONT,6X,B#01,@#3,H#2,4X
67            ; GET READY
68            ;
69            ;
70   00048    BUFF3 ADC1      ;    ADC1 ON BUS
71   00049    XFER2 H#0,ADC2  ;    LOAD ADC1 INTO RA-0
72   0004A    XFER2 H#1,ALU   ;    LOAD ADC2 INTO RA-1
73   0004B    SUBT1 H#0,H#1   ;
74   0004C    JUMP2 PROG2     ;    JUMP IF (=)
75   0004D    JUMPU PROG1     ;
76   0004E    PROG2: CLR2 H#2 ;    CLEARS H#2
77   0004F    SUBT1 H#0,H#2   ;    ARE THE SAMPLES 0
78   00050    JUMP2 BEGIN     ;    JUMP IF 0   NO SIG. PRESENT
79   00051    INVR1 H#2
80   00052    SUBT1 H#0,H#2   ;    ARE THE SAMPLES F(HEX)?
81   00053    JUMP2 BEGIN     ;    JUMP IF F
82            ;
83            ;
84            ;
85   00054    PROG1: BUFF3 ADC1 ;   ADC ON BUS
86   00055    XFER2 H#E,ADC1  ;    LOAD ADC INTO H#E
87   00056    TEST2 H#E       ;    TEST SIGN OF ADC
88   00057    JUMP1 STEP1     ;    JUMP IF SIGN FLAG =0
89            ;
90   00058    BUFF2 6@#10
91   00059    XFER3 H#D,6X    ;    LOAD (8) INTO H#D
92   0005A    JUMPU STEP2
93            ;
94            ;
95   0005B    STEP1: BUFF2 6@#07
96   0005C    XFER3 H#D,6X
97            ;                    LOAD (7) INTO H#D
98            ;
99   0005D    STEP2: INCR3 H#B,H#B
100  0005E    INCR4 H#A,H#A   ;    INCREMENT N1
101           ;
102  0005F    CHECK H#F
103  00060    CHECK H#E
104  00061    CHECK H#D
105  00062    CHECK H#C
106  00063    CHECK H#B
107  00064    CHECK H#A
108  00065    CHECK H#9
```

```
109   00066    CHECK H#8
110   00067    CHECK H#7
111   00068    CHECK H#6 ;    CHECK ALU REG'S
112            ;
113   00069    BUFF2 60#02
114   0006A    XFER3 H#1,6X ; LOAD (2) INTO H#1
115   0006B    CLR2 H#0
116   0006C    SUBT1 H#B,H#1
117   0006D    SUBT2 H#A,H#0 ;      IS N1 )2 ?
118   0006E    JUMP1 STEP3 ;  JUMP IF SIGN FLG =0
119   0006F    MOVE2 H#E,H#F ; MOVE SAMPLE TO H#F
120   00070    JUMPU BEGIN
121            ;
122            ;
123   00071    STEP3: JUMSU ABC ; GOTO MULT SR TO CHECK FOR SIGN CHANGE
124            ;
125   00072    TEST2 H#3 ;  TEST SIGN
126   00073    JUMP1 STEP4 ; JUMP IF SIGN FLG=0 (NO SIGN CHANGE)
127            ;
128   00074    INCR3 H#7,H#7
129   00075    INCR4 H#6,H#6 ;  INCREMENT N3
130            ;
131   00076    BUFF2 60#14
132   00077    XFER3 H#3,60#04
133   00078    XFER3 H#2,6X ;  LOAD (76) INTO RA2,3
134            ;
135   00079    SUBT1 H#B,H#3
136   0007A    JUMP2 STEP5 ;   JUMP IF ZERO FLG =1
137   0007B    JUMPU BEGIN
138            ;                        CHECKS IF N1 = 76
139   0007C    STEP5: SUBT1 H#B,H#3
140   0007D    SUBT2 H#A,H#2
141   0007E    JUMP2 ZZY ;     IF N1 =76 GOTO PHASE ADJ.
142   0007F    JUMPU BEGIN ;   N1(76
143            ;
144            ;
145   00080    STEP4: INCR3 H#9,H#9
146   00081    INCR4 H#8,H#8 ;   INCREMENT N2
147            ;
148   00082    BUFF2 60#14
149   00083    XFER3 H#3,60#04
150   00084    XFER3 H#2,6X ;   LOAD (76) TO H#2,3
151            ;
152   00085    SUBT1 H#B,H#3
153   00086    JUMP2 STEP6
154   00087    JUMPU BEGIN
155   00088    STEP6: SUBT1 H#B,H#3 ;           IS N1 =76 ?
156   00089    SUBT2 H#A,H#2 ;
157   0008A    JUMP2 FINSTEP ;      IF N1 =76 GOTO FINSTEP
158   0008B    JUMPU BEGIN
159            ;
160            ;
161            ;
162            ;
163            ;
164            ;
165            ;
166   001A0    ORG ZZY
167   001A0    BUFF2 60#06
168   001A1    XFER3 H#3,60#04   ;LOAD 70 INTO RA-3 AND RA-4
169   001A2    XFER3 H#4,6X
170   001A3    SUBT1 H#9,H#3
171   001A4    SUBT2 H#8,H#2 ;IS N2)70?
172   001A5    JUMP1 OUTPUT ;JUMP IF TRUE.SIGN FLAG IS 0
173   001A6    CHECK H#B
174   001A7    CHECK H#A
175   001A8    CHECK H#9
176   001A9    CHECK H#8
177   001AA    CHECK H#7
178   001AB    CHECK H#6          ; CHECK N1,N2,N3
179            ;
180            ;
```

```
181  001AC       SUBT1 H#7,H#9
182  001AD       SUBT2 H#6,H#8 ;   N3-N2=
183                ;
184  001AE       JUMP1 BUG1 ;  JUMP IF  N2<N3  SIGN FLG = 0
185                ;
186                ;            PROCEDURE FOR N2>N3
187  001AF       BUFF2 6@#04
188  001B0       XFER3 H#1,6@#00
189  001B1       XFER3 H#0,6X ;    LOAD 4 INTO RA-0,1
190                ;
191  001B2       BUFF1 6@#27
192  001B3       ADDA1 H#1,H#1,6@#26
193  001B4       ADDA2 H#0,H#0,6X ;    ADD 4 TO RAM-22,23
194                ;
195  001B5       MOVE1 H#0,6@#26
196  001B6       MOVE1 H#1,6@#27 ;    STORE INCREASED # IN RAM
197                ;
198  001B7       FF 6X,NOP,8X,0#4,PDRAM,10X,CONT,6@#27,B#01,0#3,H#A,4X
199  001B8       FF 6X,NOP,8X,0#4,PDRAM,10X,CONT,6@#26,B#01,0#3,H#6,4X
200                ;       LOADS NEW #'S INTO PHASE CKT.
201                ;
202  001B9       TEST2 H#F
203  001BA       JUMP1 Z1  ;  IF SGN 0
204  001BB       BUFF2 6@#10
205  001BC       XFER3 H#D,6X ;  PUT 8 IN RA-D FOR OUTPUT
206  001BD       JUMPU FINSTEP
207                ;
208  001BE       Z1: BUFF2 6@#07
209  001BF       XFER3 H#D,6X ; PUT 7 IN RA-D FOR OUTPUT
210  001C0       JUMPU FINSTEP
211                ;
212                ;
213                ;
214                ;
215                ;
216                ;            PROCEDURE FOR N2<N3
217  001C1       BUG1: BUFF2 6@#14
218  001C2       XFER3 H#1,6@#17 ;   LOAD (-4) INTO RA-0,1
219  001C3       XFER3 H#0,6X
220                ;
221  001C4       BUFF1 6@#27 ;   ADD (-4) TO RAM 22,23
222  001C5       ADDA1 H#1,H#1,6@#26
223  001C6       ADDA2 H#0,H#0,6X
224                ;
225  001C7       MOVE1 H#0,6@#26
226  001C8       MOVE1 H#1,6@#27 ;  MOVE DECREASED #'S TO RAM 22,23
227                ;
228  001C9       FF 6X,NOP,8X,0#4,PDRAM,10X,CONT,6@#27,B#01,0#3,H#A,4X
229  001CA       FF 6X,NOP,8X,0#4,PDRAM,10X,CONT,6@#26,B#01,0#3,H#6,4X
230                ;       LOADS NEW #'S INTO PHASE CKT.
231  001CB       TEST2 H#F
232  001CC       JUMP1 Z2 ; IF SGN = 0
233  001CD       BUFF2 6@#10
234  001CE       XFER3 H#D,6X ;  PUT 8 IN RA-D FOR OUTPUT
235  001CF       JUMPU FINSTEP
236                ;
237  001D0       Z2: BUFF2 6@#07
238  001D1       XFER3 H#D,6X ;  PUT 7 IN RA-D FOR OUTPUT
239                ;
240                ;
241                ;
242                ;
243                ;
244  001D2       FINSTEP:BUFF2 6@#06
245  001D3       XFER3 H#3,6@#04
246  001D4       XFER3 H#2,6X  ;LOAD 70 INTO RA-2,3 CHECK FOR 70GOOD SAMPLES
247                ;
248  001D5       SUBT1 H#9,H#3
249  001D6       SUBT2 H#8,H#2 ;           IS N2> OR = 38
250  001D7       JUMP1 OUTPUT ;           JUMP IF TRUE
251  001D8       JUMPU WAIT   ;           OR START OVER (NON CONCLUSIVE DATA)
252                ;
253
```

```
254   001D9   OUTPUT: FF ZB,OR,NOP,4X,H#D,Q#4,ALU,10X,CONT,6X,B#01,Q#3,H#3,4X
255           ;          PUT OUTPUT SYMBOL ON BUS
256           ;
257   001DA   WAIT: FF ZB,OR,NOP,4X,H#D,Q#4,ALU,10X,CONT,6X,B#01,Q#3,H#2,H#7
258           ;                     WAIT FOR END OF PERIOD
259           ;
260   001DB   FF ZB,OR,NOP,4X,H#D,Q#4,ALU,10X,CONT,6X,B#01,Q#3,H#2,4X
261           ;                     GET READY
262           ;
263   001DC   JUMPU PRLM
264           ;
265           ;
266           ;
267           ;
268           ;
269           ;
270   00200   ORG ABC
271   00200   MOVE2 H#E,H#1 ;         MOVE NEW SAMPLE TO H#1
272           ;
273   00201   FF ZB,OR,QREG,4X,H#F,Q#4,ALU,10X,CONT,6X,B#01,Q#3,H#2,4X
274           ;                     MOVE OLD SAMPLE TO Q-REG
275   00202   CLR2 H#3
276   00203   MULT1
277   00204   MULT1
278   00205   MULT1
279   00206   MULT2 ;   MULTIPLY  OLD X NEW , M.S. BYTE IN H#3
280   00207   RETUR
281           ;
282           ;
283           ;
284           ;
285
286   003FF   ORG 10Q#1777;
287   003FF   FF 5X,NOP,8X,Q#4,ALU,KPLN,CJP,5X,B#01,Q#3,H#2,4X
288           ;  JUMP TO KPLN FROM ADDRESS  H#3FF
289           END
```

TOTAL ASSEMBLY ERRORS =    0

BI PHASE DEMODULATOR

CROSS REFERENCE TABLE

| LABEL | TYPE | VALUE | REFERENCES | | | | | | |
|---|---|---|---|---|---|---|---|---|---|
| AB | A | 00001 | | | | | | | |
| ABC | A | 00200 | -123 | -270 | | | | | |
| ADC1 | A | 00000 | -70 | -85 | -86 | | | | |
| ADC2 | A | 00001 | -71 | | | | | | |
| ADD | A | 00000 | | | | | | | |
| ADDA1 | D | | -192 | -222 | | | | | |
| ADDA2 | D | | -193 | -223 | | | | | |
| ADDA3 | D | | | | | | | | |
| ADDA4 | D | | | | | | | | |
| ADDA5 | D | | | | | | | | |
| ADDA6 | D | | | | | | | | |
| ADDA7 | D | | | | | | | | |
| ALU | A | 00005 | -7 | -64 | -66 | -72 | -254 | -257 | -260 -273 |
| | | | -287 | | | | | | |
| AND | A | 00004 | | | | | | | |
| AQ | A | 00000 | | | | | | | |
| BCD | A | 00240 | | | | | | | |
| BEGIN | A | 00046 | -64 | -78 | -81 | -120 | -137 | -142 | -154 -158 |
| BUFF1 | D | | -191 | -221 | | | | | |
| BUFF2 | D | | -11 | -90 | -95 | -113 | -131 | -148 | -167 -187 |
| | | | -204 | -208 | -217 | -233 | -237 | -244 | |
| BUFF3 | D | | -70 | -85 | | | | | |
| BUG1 | A | 001C1 | -184 | -217 | | | | | |
| CHECK | D | | -102 | -103 | -104 | -105 | -106 | -107 | -108 -109 |
| | | | -110 | -111 | -173 | -174 | -175 | -176 | -177 -178 |

| | | | | | | | | | |
|---|---|---|---|---|---|---|---|---|---|
| CJP | A | 00003 | -7 | -287 | | | | | |
| CJPP | A | 0000B | | | | | | | |
| CJS | A | 00001 | | | | | | | |
| CJV | A | 00006 | | | | | | | |
| CLR1 | D | | -40 | -41 | -42 | -43 | -44 | -45 | -46 | -47 |
| | | | -48 | -49 | -50 | -51 | -52 | -53 | -54 | -55 |
| | | | -56 | -57 | -58 | -59 | -60 | -61 | | |
| CLR2 | D | | -23 | -24 | -25 | -26 | -27 | -28 | -29 | -30 |
| | | | -31 | -32 | -33 | -34 | -35 | -36 | -37 | -38 |
| | | | -76 | -115 | -275 | | | | | |
| CNROM | A | 00003 | | | | | | | |
| CONT | A | 0000E | -16 | -17 | -64 | -66 | -198 | -199 | -228 | -229 |
| | | | -254 | -257 | -260 | -273 | | | | |
| CRTN | A | 0000A | | | | | | | |
| DA | A | 00005 | | | | | | | |
| DQ | A | 00006 | | | | | | | |
| DZ | A | 00007 | | | | | | | |
| EXNOR | A | 00007 | | | | | | | |
| EXOR | A | 00006 | | | | | | | |
| FINSTEP | A | 001D2 | -157 | -206 | -210 | -235 | -244 | | | |
| INCR1 | D | | | | | | | | | |
| INCR2 | D | | | | | | | | | |
| INCR3 | D | | -99 | -128 | -145 | | | | | |
| INCR4 | D | | -100 | -129 | -146 | | | | | |
| INVR1 | D | | -79 | | | | | | | |
| INVR2 | D | | | | | | | | | |
| INVR3 | D | | | | | | | | | |
| JMAP | A | 00002 | | | | | | | |
| JRP | A | 00007 | | | | | | | |
| JSRP | A | 00005 | | | | | | | |
| JUMP1 | D | | -88 | -118 | -126 | -172 | -184 | -203 | -232 | -250 |
| JUMP2 | D | | -74 | -78 | -81 | -136 | -141 | -153 | -157 | |
| JUMPU | D | | -20 | -75 | -92 | -120 | -137 | -142 | -154 | -158 |
| | | | -206 | -210 | -235 | -251 | -263 | | | |
| JUMSU | D | | -123 | | | | | | | |
| JZ | A | 00000 | | | | | | | |
| KPLN | A | 00010 | -7 | -10 | -287 | | | | | |
| LDCT | A | 0000C | | | | | | | |
| LOAD1 | D | | | | | | | | | |
| LOOP | A | 0000D | | | | | | | |
| MINU1 | D | | | | | | | | | |
| MINU2 | D | | | | | | | | | |
| MINU3 | D | | | | | | | | | |
| MINU4 | D | | | | | | | | | |
| MOVE1 | D | | -14 | -15 | -195 | -196 | -225 | -226 | | |
| MOVE2 | D | | -119 | -271 | | | | | | |
| MOVE3 | D | | | | | | | | | |
| MOVE4 | D | | | | | | | | | |
| MULT1 | D | | -276 | -277 | -278 | | | | | |
| MULT2 | D | | -279 | | | | | | | |
| NARG | A | 00000 | | | | | | | |
| NOP | A | 00001 | -7 | -16 | -17 | -64 | -66 | -198 | -199 | -228 |
| | | | -229 | -254 | -257 | -260 | -287 | | | |
| NOTRS | A | 00005 | | | | | | | |
| OR | A | 00003 | -254 | -257 | -260 | -273 | | | | |
| OUTPUT | A | 001D9 | -172 | -250 | -254 | | | | | |
| PDRAM | A | 00002 | -16 | -17 | -198 | -199 | -228 | -229 | | |
| PKLM | A | 00020 | -20 | -22 | -263 | | | | | |
| PROG1 | A | 00054 | -75 | -85 | | | | | | |
| PROG2 | A | 0004E | -74 | -76 | | | | | | |
| PUSH | A | 00004 | | | | | | | |
| QREG | A | 00000 | -273 | | | | | | | |
| R0 | A | 00000 | | | | | | | |
| R1 | A | 00001 | | | | | | | |
| R10 | A | 0000A | | | | | | | |
| R11 | A | 0000B | | | | | | | |
| R12 | A | 0000C | | | | | | | |
| R13 | A | 0000D | | | | | | | |
| R14 | A | 0000E | | | | | | | |
| R15 | A | 0000F | | | | | | | |
| R2 | A | 00002 | | | | | | | |
| R3 | A | 00003 | | | | | | | |

| | | | | | | | | | |
|---|---|---|---|---|---|---|---|---|---|
| R4 | A | 00004 | | | | | | | |
| R5 | A | 00005 | | | | | | | |
| R6 | A | 00006 | | | | | | | |
| R7 | A | 00007 | | | | | | | |
| R8 | A | 00008 | | | | | | | |
| R9 | A | 00009 | | | | | | | |
| RAMA | A | 00002 | | | | | | | |
| RAMD | A | 00005 | | | | | | | |
| RAMF | A | 00003 | | | | | | | |
| RAMGD | A | 00004 | | | | | | | |
| RAMGU | A | 00006 | | | | | | | |
| RAMU | A | 00007 | | | | | | | |
| RETUR | D | | −280 | | | | | | |
| RFCT | A | 00008 | | | | | | | |
| RPCT | A | 00009 | | | | | | | |
| RPEAT | D | | | | | | | | |
| STEP1 | A | 0005B | −88 | −95 | | | | | |
| STEP2 | A | 0005D | −92 | −99 | | | | | |
| STEP3 | A | 00071 | −118 | −123 | | | | | |
| STEP4 | A | 00080 | −126 | −145 | | | | | |
| STEP5 | A | 0007C | −136 | −139 | | | | | |
| STEP6 | A | 00088 | −153 | −155 | | | | | |
| SUBR | A | 00001 | | | | | | | |
| SUBS | A | 00002 | | | | | | | |
| SUBT1 | D | | −73 | −77 | −80 | −116 | −135 | −139 | −152 | −155 |
| | | | −170 | −181 | −248 | | | | |
| SUBT2 | D | | −117 | −140 | −156 | −171 | −182 | −249 | |
| SUBT3 | D | | | | | | | | |
| SUBT4 | D | | | | | | | | |
| TEST1 | D | | | | | | | | |
| TEST2 | D | | −87 | −125 | −202 | −231 | | | |
| TRIG | A | 00004 | | | | | | | |
| TWB | A | 0000F | | | | | | | |
| WAIT | A | 001DA | −251 | −257 | | | | | |
| XFER1 | D | | | | | | | | |
| XFER2 | D | | −71 | −72 | −86 | | | | |
| XFER3 | D | | −12 | −13 | −91 | −96 | −114 | −132 | −133 | −149 |
| | | | −150 | −168 | −169 | −188 | −189 | −205 | −209 | −218 |
| | | | −219 | −234 | −238 | −245 | −246 | | |
| XYZ | A | 000CB | | | | | | | |
| Z1 | A | 001BE | −203 | −208 | | | | | |
| Z2 | A | 001D0 | −232 | −237 | | | | | |
| ZA | A | 00004 | | | | | | | |
| ZB | A | 00003 | −254 | −257 | −260 | −273 | | | |
| ZQ | A | 00002 | | | | | | | |
| ZZY | A | 001A0 | −141 | −166 | | | | | |
| ZZZ | A | 00140 | | | | | | | |

OBJECT MODULE

```
00000  XXXXXX001XXXXXXX X100101000001000 00011XXXXXX01011 0010XXXX
00010  111011001XXXXXXX X100011XXXXXXXXX X111000000001011 0010XXXX
00011  111011011XXXX000 1100011XXXXXXXXX X111000100001011 0010XXXX
00012  111011011XXXX000 0100011XXXXXXXXX X1110XXXXXX01011 0010XXXX
00013  011011011XXXX000 1100011XXXXXXXXX X111001011101001 0010XXXX
00014  011011011XXXX000 0100101XXXXXXXXX X111001011101001 0010XXXX
00015  XXXXXX001XXXXXXX X100010XXXXXXXXX X111001011101011 1010XXXX
00016  XXXXXX001XXXXXXX X100010XXXXXXXXX X111001011011011 0110XXXX
00017  XXXXXX001XXXXXXX X100101000010000 00011XXXXXX01010 0010XXXX
00020  011100011XXXX000 0100101XXXXXXXXX X1110XXXXXX01011 0010XXXX
00021  011100011XXXX000 1100101XXXXXXXXX X1110XXXXXX01011 0010XXXX
00022  011100011XXXX001 0100101XXXXXXXXX X1110XXXXXX01011 0010XXXX
00023  011100011XXXX001 1100101XXXXXXXXX X1110XXXXXX01011 0010XXXX
00024  011100011XXXX010 0100101XXXXXXXXX X1110XXXXXX01011 0010XXXX
00025  011100011XXXX010 1100101XXXXXXXXX X1110XXXXXX01011 0010XXXX
00026  011100011XXXX011 0100101XXXXXXXXX X1110XXXXXX01011 0010XXXX
00027  011100011XXXX011 1100101XXXXXXXXX X1110XXXXXX01011 0010XXXX
00028  011100011XXXX100 0100101XXXXXXXXX X1110XXXXXX01011 0010XXXX
00029  011100011XXXX100 1100101XXXXXXXXX X1110XXXXXX01011 0010XXXX
0002A  011100011XXXX101 0100101XXXXXXXXX X1110XXXXXX01011 0010XXXX
```

```
0002B   011100011XXXX101 1100101XXXXXXXX X1110XXXXXX01011 0010XXXX
0002C   011100011XXXX110 0100101XXXXXXXX X1110XXXXXX01011 0010XXXX
0002D   011100011XXXX110 1100101XXXXXXXX X1110XXXXXX01011 0010XXXX
0002E   011100011XXXX111 0100101XXXXXXXX X1110XXXXXX01011 0010XXXX
0002F   011100011XXXX111 1100101XXXXXXXX X1110XXXXXX01011 0010XXXX
00030   011100011XXXX000 0100101XXXXXXXX X111000000001001 0010XXXX
00031   011100011XXXX000 0100101XXXXXXXX X111000000101001 0010XXXX
00032   011100011XXXX000 0100101XXXXXXXX X111000001001001 0010XXXX
00033   011100011XXXX000 0100101XXXXXXXX X111000001101001 0010XXXX
00034   011100011XXXX000 0100101XXXXXXXX X111000010001001 0010XXXX
00035   011100011XXXX000 0100101XXXXXXXX X111000010101001 0010XXXX
00036   011100011XXXX000 0100101XXXXXXXX X111000011001001 0010XXXX
00037   011100011XXXX000 0100101XXXXXXXX X111000011101001 0010XXXX
00038   011100011XXXX000 0100101XXXXXXXX X111000100001001 0010XXXX
00039   011100011XXXX000 0100101XXXXXXXX X111000100101001 0010XXXX
0003A   011100011XXXX000 0100101XXXXXXXX X111000101001001 0010XXXX
0003B   011100011XXXX000 0100101XXXXXXXX X111000101101001 0010XXXX
0003C   011100011XXXX000 0100101XXXXXXXX X111000110001001 0010XXXX
0003D   011100011XXXX000 0100101XXXXXXXX X111000110101001 0010XXXX
0003E   011100011XXXX000 0100101XXXXXXXX X111000111001001 0010XXXX
0003F   011100011XXXX000 0100101XXXXXXXX X111000111101001 0010XXXX
00040   011100011XXXX000 0100101XXXXXXXX X111001000001001 0010XXXX
00041   011100011XXXX000 0100101XXXXXXXX X111001000101001 0010XXXX
00042   011100011XXXX000 0100101XXXXXXXX X111001001001001 0010XXXX
00043   011100011XXXX000 0100101XXXXXXXX X111001001101001 0010XXXX
00044   011100011XXXX000 0100101XXXXXXXX X111001010001001 0010XXXX
00045   011100011XXXX000 0100101XXXXXXXX X111001010101001 0010XXXX
00046   XXXXX001XXXXXXX X100101XXXXXXXX X1110XXXXXX01011 0000XXXX
00047   XXXXX001XXXXXXX X100101XXXXXXXX X1110XXXXXX01011 0010XXXX
00048   111011001XXXXXXX X100000XXXXXXXX X1110XXXXXX01011 0010XXXX
00049   111011011XXXX000 0100001XXXXXXXX X1110XXXXXX01011 0010XXXX
0004A   111011011XXXX000 1100101XXXXXXXX X1110XXXXXX01011 0010XXXX
0004B   001010001000000 1000101XXXXXXXX X1110XXXXXX01011 0010XXXX
0004C   XXXXX001XXXXXXX X100101000100111 00011XXXXXX01011 0010XXXX
0004D   XXXXX001XXXXXXX X100101000101010 00011XXXXXX01010 0010XXXX
0004E   011100011XXXX001 0100101XXXXXXXX X1110XXXXXX01011 0010XXXX
0004F   001010001000001 0000101XXXXXXXX X1110XXXXXX01011 0010XXXX
00050   XXXXX001XXXXXXX X100101000100011 00011XXXXXX01011 0010XXXX
00051   011010010XXXX001 0100101XXXXXXXX X1110XXXXXX00011 0010XXXX
00052   001010001000001 0001011XXXXXXXX X1110XXXXXX01011 0010XXXX
00053   XXXXX001XXXXXXX X100101000100011 00011XXXXXX01011 0010XXXX
00054   111011001XXXXXXX X100000XXXXXXXX X1110XXXXXX01011 0010XXXX
00055   111011011XXXX111 0100000XXXXXXXX X1110XXXXXX01011 0010XXXX
00056   011000011XXXX111 0100101XXXXXXXX X1110XXXXXX00011 0010XXXX
00057   XXXXX001XXXXXXX X100101000101101 10011XXXXXX01111 0010XXXX
00058   111011001XXXXXXX X100011XXXXXXXX X111000100001011 0010XXXX
00059   111011011XXXX110 1100011XXXXXXXX X1110XXXXXX01011 0010XXXX
0005A   XXXXX001XXXXXXX X100101000101110 10011XXXXXX01010 0010XXXX
0005B   111011001XXXXXXX X100011XXXXXXXX X111000011101011 0010XXXX
0005C   111011011XXXX110 1100011XXXXXXXX X1110XXXXXX01011 0010XXXX
0005D   100000111011101 1100101XXXXXXXX X1110XXXXXX01011 0010XXXX
0005E   100000111010101 0100101XXXXXXXX X1110XXXXXX01011 0010XXXX
0005F   011011001XXXX111 1100101XXXXXXXX X1110XXXXXX01011 0010XXXX
00060   011011001XXXX111 0100101XXXXXXXX X1110XXXXXX01011 0010XXXX
00061   011011001XXXX110 1100101XXXXXXXX X1110XXXXXX01011 0010XXXX
00062   011011001XXXX110 0100101XXXXXXXX X1110XXXXXX01011 0010XXXX
00063   011011001XXXX101 1100101XXXXXXXX X1110XXXXXX01011 0010XXXX
00064   011011001XXXX101 0100101XXXXXXXX X1110XXXXXX01011 0010XXXX
00065   011011001XXXX100 1100101XXXXXXXX X1110XXXXXX01011 0010XXXX
00066   011011001XXXX100 0100101XXXXXXXX X1110XXXXXX01011 0010XXXX
00067   011011001XXXX011 1100101XXXXXXXX X1110XXXXXX01011 0010XXXX
00068   011011001XXXX011 0100101XXXXXXXX X1110XXXXXX01011 0010XXXX
00069   111011001XXXXXXX X100011XXXXXXXX X111000001001011 0010XXXX
0006A   111011011XXXX000 1100011XXXXXXXX X1110XXXXXX01011 0010XXXX
0006B   011100011XXXX000 0100101XXXXXXXX X1110XXXXXX01011 0010XXXX
0006C   001010001101100 1000101XXXXXXXX X1110XXXXXX01011 0010XXXX
0006D   001010001101000 0100101XXXXXXXX X1110XXXXXX01011 0010XXXX
0006E   XXXXX001XXXXXXX X100101000111000 10011XXXXXX01111 0010XXXX
0006F   100011010111011 1100101XXXXXXXX X1110XXXXXX01011 0010XXXX
00070   XXXXX001XXXXXXX X100101000100011 00011XXXXXX01010 0010XXXX
00071   XXXXX001XXXXXXX X100101100000000 00001XXXXXX01010 0010XXXX
```

| | | | | |
|---|---|---|---|---|
| 00072 | 011000011XXXX001 | 1100101XXXXXXXX | X1110XXXXXX00011 | 0010XXXX |
| 00073 | XXXXXX001XXXXXXX | X100101001000000 | 00011XXXXXX01111 | 0010XXXX |
| 00074 | 1000000110111011 | 1000101XXXXXXXX | X1110XXXXXX01011 | 0010XXXX |
| 00075 | 1000000110110011 | 0100101XXXXXXXX | X1110XXXXXX01011 | 0010XXXX |
| 00076 | 111011001XXXXXXX | X100011XXXXXXXX | X111000110001011 | 0010XXXX |
| 00077 | 111011011XXXX001 | 1100011XXXXXXXX | X111000010001011 | 0010XXXX |
| 00078 | 111011011XXXX001 | 0100011XXXXXXXX | X1110XXXXXX01011 | 0010XXXX |
| 00079 | 0010100011011001 | 1000101XXXXXXXX | X1110XXXXXX01011 | 0010XXXX |
| 0007A | XXXXXX001XXXXXXX | X100101000111110 | 00011XXXXXX01011 | 0010XXXX |
| 0007B | XXXXXX001XXXXXXX | X100101000100011 | 00011XXXXXX01010 | 0010XXXX |
| 0007C | 0010100011011001 | 1000101XXXXXXXX | X1110XXXXXX01011 | 0010XXXX |
| 0007D | 0010100011010001 | 0100101XXXXXXXX | X1110XXXXXX01011 | 0010XXXX |
| 0007E | XXXXXX001XXXXXXX | X100101011010000 | 00011XXXXXX01011 | 0010XXXX |
| 0007F | XXXXXX001XXXXXXX | X100101000100011 | 00011XXXXXX01010 | 0010XXXX |
| 00080 | 1000000111001100 | 1000101XXXXXXXX | X1110XXXXXX01011 | 0010XXXX |
| 00081 | 1000000111000100 | 0100101XXXXXXXX | X1110XXXXXX01011 | 0010XXXX |
| 00082 | 111011001XXXXXXX | X100011XXXXXXXX | X111000110001011 | 0010XXXX |
| 00083 | 111011011XXXX001 | 1100011XXXXXXXX | X111000010001011 | 0010XXXX |
| 00084 | 111011011XXXX001 | 0100011XXXXXXXX | X1110XXXXXX01011 | 0010XXXX |
| 00085 | 0010100011011001 | 1000101XXXXXXXX | X1110XXXXXX01011 | 0010XXXX |
| 00086 | XXXXXX001XXXXXXX | X100101001000100 | 00011XXXXXX01011 | 0010XXXX |
| 00087 | XXXXXX001XXXXXXX | X100101000100011 | 00011XXXXXX01010 | 0010XXXX |
| 00088 | 0010100011011001 | 1000101XXXXXXXX | X1110XXXXXX01011 | 0010XXXX |
| 00089 | 0010100011010001 | 0100101XXXXXXXX | X1110XXXXXX01011 | 0010XXXX |
| 0008A | XXXXXX001XXXXXXX | X100101011101001 | 00011XXXXXX01011 | 0010XXXX |
| 0008B | XXXXXX001XXXXXXX | X100101000100011 | 00011XXXXXX01010 | 0010XXXX |
| 001A0 | 111011001XXXXXXX | X100011XXXXXXXX | X111000011001011 | 0010XXXX |
| 001A1 | 111011011XXXX001 | 1100011XXXXXXXX | X111000010001011 | 0010XXXX |
| 001A2 | 111011011XXXX010 | 0100011XXXXXXXX | X1110XXXXXX01011 | 0010XXXX |
| 001A3 | 0010100011001001 | 1000101XXXXXXXX | X1110XXXXXX01011 | 0010XXXX |
| 001A4 | 0010100011000001 | 0100101XXXXXXXX | X1110XXXXXX01011 | 0010XXXX |
| 001A5 | XXXXXX001XXXXXXX | X100101011101100 | 10011XXXXXX01111 | 0010XXXX |
| 001A6 | 011011001XXXX101 | 1100101XXXXXXXX | X1110XXXXXX01011 | 0010XXXX |
| 001A7 | 011011001XXXX101 | 0100101XXXXXXXX | X1110XXXXXX01011 | 0010XXXX |
| 001A8 | 011011001XXXX100 | 1100101XXXXXXXX | X1110XXXXXX01011 | 0010XXXX |
| 001A9 | 011011001XXXX100 | 0100101XXXXXXXX | X1110XXXXXX01011 | 0010XXXX |
| 001AA | 011011001XXXX011 | 1100101XXXXXXXX | X1110XXXXXX01011 | 0010XXXX |
| 001A8 | 011011001XXXX100 | 1100101XXXXXXXX | X1110XXXXXX01011 | 0010XXXX |
| 001A9 | 011011001XXXX100 | 0100101XXXXXXXX | X1110XXXXXX01011 | 0010XXXX |
| 001AA | 011011001XXXX011 | 1100101XXXXXXXX | X1110XXXXXX01011 | 0010XXXX |
| 001AB | 011011001XXXX011 | 0100101XXXXXXXX | X1110XXXXXX01011 | 0010XXXX |
| 001AC | 0010100010111100 | 1000101XXXXXXXX | X1110XXXXXX01011 | 0010XXXX |
| 001AD | 0010100010110100 | 0100101XXXXXXXX | X1110XXXXXX01011 | 0010XXXX |
| 001AE | XXXXXX001XXXXXXX | X100101011100000 | 10011XXXXXX01111 | 0010XXXX |
| 001AF | 111011001XXXXXXX | X100011XXXXXXXX | X111000010001011 | 0010XXXX |
| 001B0 | 111011011XXXX000 | 1100011XXXXXXXX | X111000000001011 | 0010XXXX |
| 001B1 | 111011011XXXX000 | 0100011XXXXXXXX | X1110XXXXXX01011 | 0010XXXX |
| 001B2 | 111011001XXXXXXX | X100010XXXXXXXX | X111001011101011 | 0010XXXX |
| 001B3 | 1010001000001000 | 1100010XXXXXXXX | X111001011000011 | 0010XXXX |
| 001B4 | 1010001000000000 | 0100010XXXXXXXX | X1110XXXXXX01011 | 0010XXXX |
| 001B5 | 011011011XXXX000 | 0100101XXXXXXXX | X111001011001001 | 0010XXXX |
| 001B6 | 011011011XXXX000 | 1100101XXXXXXXX | X111001011101001 | 0010XXXX |
| 001B7 | XXXXXX001XXXXXXX | X100010XXXXXXXX | X111001011101011 | 1010XXXX |
| 001B8 | XXXXXX001XXXXXXX | X100010XXXXXXXX | X111001011001011 | 0110XXXX |
| 001B9 | 011000011XXXX111 | 1100101XXXXXXXX | X1110XXXXXX00011 | 0010XXXX |
| 001BA | XXXXXX001XXXXXXX | X100101011011111 | 00011XXXXXX01111 | 0010XXXX |
| 001BB | 111011001XXXXXXX | X100011XXXXXXXX | X111000100001011 | 0010XXXX |
| 001BC | 111011011XXXX110 | 1100011XXXXXXXX | X1110XXXXXX01011 | 0010XXXX |
| 001BD | XXXXXX001XXXXXXX | X100101011101001 | 00011XXXXXX01010 | 0010XXXX |
| 001BE | 111011001XXXXXXX | X100011XXXXXXXX | X111000111001011 | 0010XXXX |
| 001BF | 111011011XXXX110 | 1100011XXXXXXXX | X1110XXXXXX01011 | 0010XXXX |
| 001C0 | XXXXXX001XXXXXXX | X100101011101001 | 00011XXXXXX01010 | 0010XXXX |
| 001C1 | 111011001XXXXXXX | X100011XXXXXXXX | X111000110001011 | 0010XXXX |
| 001C2 | 111011011XXXX000 | 1100011XXXXXXXX | X111000111101011 | 0010XXXX |
| 001C3 | 111011011XXXX000 | 0100011XXXXXXXX | X1110XXXXXX01011 | 0010XXXX |
| 001C4 | 111011001XXXXXXX | X100010XXXXXXXX | X111001011101011 | 0010XXXX |
| 001C5 | 1010001000001000 | 1100010XXXXXXXX | X111001011000011 | 0010XXXX |
| 001C6 | 1010001000000000 | 0100010XXXXXXXX | X1110XXXXXX01011 | 0010XXXX |
| 001C7 | 011011011XXXX000 | 0100101XXXXXXXX | X111001011001001 | 0010XXXX |
| 001C8 | 011011011XXXX000 | 1100101XXXXXXXX | X111001011101001 | 0010XXXX |
| 001C9 | XXXXXX001XXXXXXX | X100010XXXXXXXX | X111001011101011 | 1010XXXX |

```
001CA    XXXXXX001XXXXXXX  X10001XXXXXXXXXX  X111001011001011  0110XXXX
001CB    01100001XXXXX111  11001010XXXXXXXX  X1110XXXXXX00011  0010XXXX
001CC    XXXXXX001XXXXXXX  X10010101101000   00011XXXXXX01111  0010XXXX
001CD    11101100XXXXXXXX  X10001XXXXXXXXXX  X111000100001011  0010XXXX
001CE    11101101XXXX110   11000011XXXXXXXX  X1110XXXXXX01011  0010XXXX
001CF    XXXXXX001XXXXXXX  X10010101101001   00011XXXXXXX01010 0010XXXX
001D0    11101100XXXXXXXX  X10001XXXXXXXXXX  X111000011101011  0010XXXX
001D1    11101101XXXX110   11000011XXXXXXXX  X1110XXXXXX01011  0010XXXX
001D2    11101100XXXXXXXX  X10001XXXXXXXXXX  X111000011001011  0010XXXX
001D3    11101101XXXX001   11000011XXXXXXXX  X111000010001011  0010XXXX
001D4    11101101XXXXX001  01000011XXXXXXXX  X1110XXXXXX01011  0010XXXX
001D5    00101000110010 01 100010 1XXXXXXXXX X1110XXXXXX01011  0010XXXX
001D6    00101000110000 01 010010 1XXXXXXXXX X1110XXXXXX01011  0010XXXX
001D7    XXXXXX001XXXXXXX  X10010101110100   10011XXXXXXX01111 0010XXXX
001D8    XXXXXX001XXXXXXX  X100101011101101  00011XXXXXX01010  0010XXXX
001D9    01101100XXXX110   11001101XXXXXXXX  X1110XXXXXX01011  0011XXXX
001DA    01101100XXXX110   11001001XXXXXXXX  X1110XXXXXX01011  00100111
001DB    01101100XXXX110   11001001XXXXXXXX  X1110XXXXXX01011  0010XXXX
001DC    XXXXXX001XXXXXXX  X10010100001000   00011XXXXXX01010  0010XXXX
00200    10001101011000    11001001XXXXXXXX  X1110XXXXXX01011  0010XXXX
00201    01101100XXXX111   11001001XXXXXXXX  X1110XXXXXX01011  0010XXXX
00202    01110001XXXX001   11001001XXXXXXXX  X1110XXXXXX01011  0010XXXX
00203    00100010000001001 11101001XXXXXXXX  X1110XXXXXX00010  0010XXXX
00204    00100010000001001 11101001XXXXXXXX  X1110XXXXXX00010  0010XXXX
00205    00100010000001001 11101001XXXXXXXX  X1110XXXXXX00010  0010XXXX
00206    00100110000001001 10101001XXXXXXXX  X1110XXXXXX01010  0010XXXX
00207    XXXXXX001XXXXXXX  X10010 1XXXXXXXXX X1010XXXXXX01010  0010XXXX
003FF    XXXXXX001XXXXXXX  X10010100001000   00011XXXXXX01011  0010XXXX
```

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A BPSK synchronizer for bit synchronizing with an output clock a modulated input signal having a sinusoidal carrier frequency of f and a binary modulating signal, where f is much greater than the modulating signal bit rate, said synchronizer comprising:

means for taking several samples of the amplitude of the input signal over a sampling interval portion of each modulating signal bit period, wherein the frequency f is an integral multiple of the rate at which said sampling means samples the amplitude of the input signal;

coupled to the sampling means, means for recording, for each sampling interval, the total number of samples, the number of samples that change sign with respect to a reference sample, and the number of samples that do not change sign with respect to the reference sample;

coupled to the recording means, means for determining a synchronization condition when, within a sampling interval, the number of samples which have been recorded not to have changed sign exceeds a preselected threshold level; and coupled to the determining means, means for generating an output clock synchronized with the modulated input signal, and having a frequency equal to the modulating signal bit rate, when the determining means has determined a synchronization condition.

2. The synchronizer of claim 1 wherein the carrier frequency is at least 16 times greater than the modulating signal bit rate.

3. The synchronizer of claim 1 wherein the reference sample is the first sample taken by the sampling means during each sampling interval.

4. The synchronizer of claim 1 wherein the sampling means comprises: an analog-to-digital converter having an input coupled to the input signal; and a sampling clock generator, having an input coupled to the input signal, for producing a clock which oscillates at the desired sampling rate.

5. The synchronizer of claim 1 wherein the recording means determines whether a given sample has changed sign by multiplying the digitized value of the given sample by the digitized value of the reference sample.

6. The synchronizer of claim 1 further comprising, coupled to the determining means, means for time-shifting the subsequent sampling interval when the number of samples which have been recorded not to have changed sign does not exceed the preselected threshold level.

* * * * *